United States Patent
Kolam et al.

(10) Patent No.: US 9,507,806 B1
(45) Date of Patent: Nov. 29, 2016

(54) EFFICIENT DELIVERY OF IMAGE FILES

(71) Applicant: Instart Logic, Inc., Mountain View, CA (US)

(72) Inventors: Hariharan Kolam, Palo Alto, CA (US); Brian Kennedy, Mountain View, CA (US)

(73) Assignee: Instart Logic, Inc., Palo Alto, CA (US)

( * ) Notice: Subject to any disclaimer, the term of this patent is extended or adjusted under 35 U.S.C. 154(b) by 198 days.

(21) Appl. No.: 14/265,891

(22) Filed: Apr. 30, 2014

(51) Int. Cl.
*G06F 7/02* (2006.01)
*G06F 17/30* (2006.01)
*H04N 7/01* (2006.01)

(52) U.S. Cl.
CPC ..... *G06F 17/3028* (2013.01); *G06F 17/30076* (2013.01); *G06F 17/30899* (2013.01); *H04N 7/012* (2013.01)

(58) Field of Classification Search
CPC .. H04N 7/012; G06F 17/30899; G06F 17/30
See application file for complete search history.

(56) References Cited

U.S. PATENT DOCUMENTS

| | | | |
|---|---|---|---|
| 8,554,832 B1 | 10/2013 | Moskovitz et al. | |
| 9,253,013 B1 * | 2/2016 | Kolam | H04L 29/08072 |
| 2002/0156702 A1 | 10/2002 | Kane | |
| 2008/0052387 A1 | 2/2008 | Heinz et al. | |
| 2008/0077653 A1 | 3/2008 | Morris | |
| 2009/0089448 A1 * | 4/2009 | Sze | G06F 9/4443 709/231 |
| 2009/0292984 A1 | 11/2009 | Bauchot et al. | |
| 2010/0008580 A1 | 1/2010 | Mizuno | |
| 2012/0016933 A1 | 1/2012 | Day et al. | |

* cited by examiner

*Primary Examiner* — Bruce Moser
(74) *Attorney, Agent, or Firm* — Van Pelt, Yi & James LLP (57) ABSTRACT

A method of delivering images by an edge server to a web browser is disclosed. It includes receiving through an interface a request for an image file. It includes detecting by a processor the image file as a non-interlaced image file. It includes converting by the processor the detected non-interlaced image file to a corresponding interlaced image file. It includes sending a first segment of the corresponding interlaced image file in response to the request for the image file and delaying delivery of a second segment of the corresponding interlaced image file until a subsequent request for the second segment of the corresponding interlaced image file is received.

21 Claims, 9 Drawing Sheets

FIG. 1

```
<html>
  <head>
    <title>Welcome</title>
  </head>
  <body>
    <h1>HelloWorld </h1>
        .
        .
        .
    <img src = "url for image"/>
    <video>
        <source src = "url for video" type = "video/ogg"  />
    </video>
    <script type = "text/javascript">
    <!--script
    *** Some javascript code is placed here ***
    -- >
    </script>

</body>
</html>
```

Script

FIG. 9

EFFICIENT DELIVERY OF IMAGE FILES

BACKGROUND OF THE INVENTION

Typically, a web browser needs to completely download an entire image in a webpage before the resources (e.g., a client-server connection) that are used to download or render the image can be used to download or render another image on the webpage. When a webpage contains many images, there may be insufficient resources to download all the images on the webpage concurrently. As a result, the startup wait time experienced by an end-user in a browsing session may become unacceptably long on higher-latency networks, such as cellular 3G networks. Therefore, improved techniques for delivering images on a webpage would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
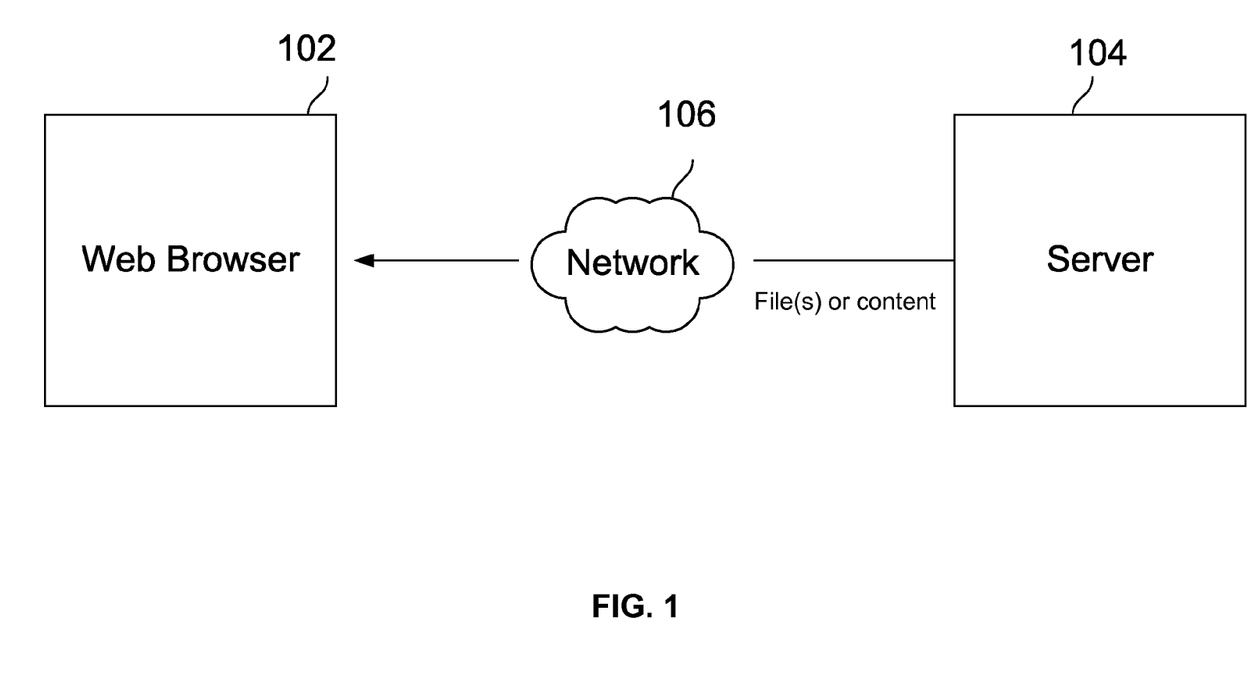
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

Figure 2:
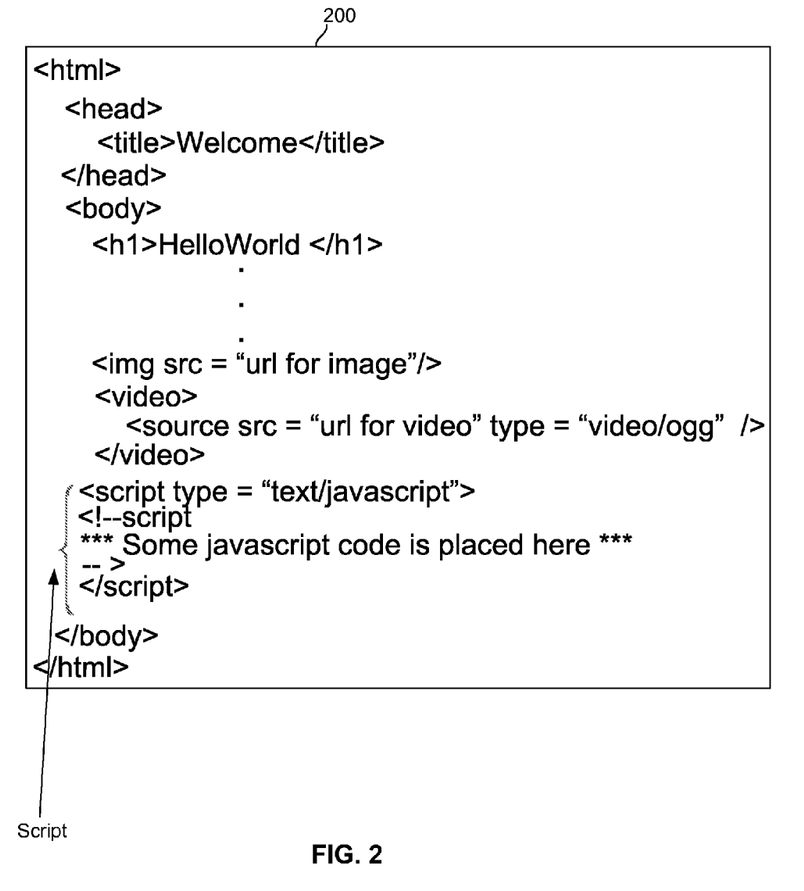
FIG. 2 is a diagram illustrating an embodiment of a webpage 200 described by an HTML file.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard is specified in different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, while others are leaf nodes that cannot have any object below them in the document tree structure hierarchy.

Figure 3:
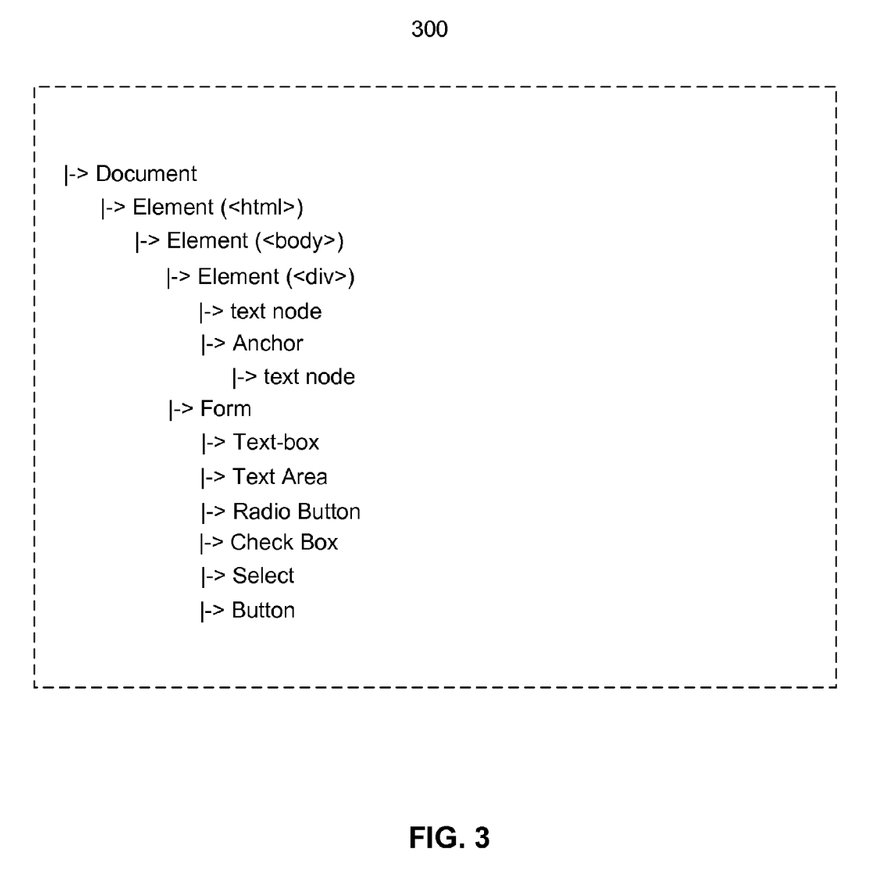
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from an uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by Javascript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate responses (e.g., N separate HTTP responses) are sent to web browser 102, delivering the dependent resources to web browser 102.

The round trip time or network response time for a GET request to arrive at an edge server and for its corresponding response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the overall network may vary depending on the network type(s) of its constituents.

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server, then, is approximately 200 milliseconds. To improve network performance, present day browsers have become more efficient in reusing connections to the same server, such that typically less than 20% of the connections may be fresh connections.

Some networks have relatively higher network latency. For example, the network latency associated with a $3^{rd}$ generation mobile telecommunications (3G) network, is relatively high, e.g., on the order of 100 milliseconds. In this instance, the total network latency associated with receiving the dependent resources associated with the twenty links and/or URLs from the edge server is then on the order of 2 seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Therefore, improved techniques for delivering information corresponding to a webpage would be desirable.

Figure 4:
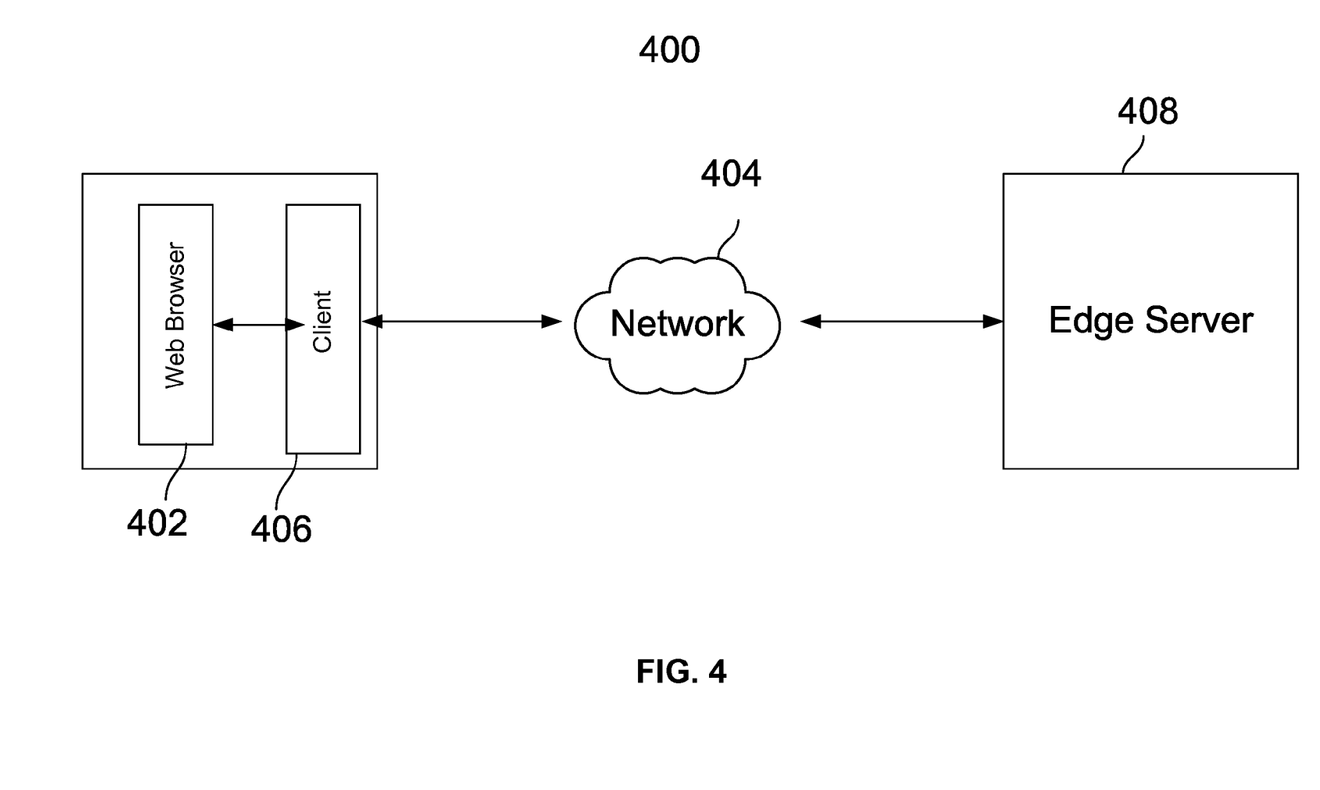
FIG. 4 is a block diagram illustrating an embodiment of a client-server system 400 for virtualizing a DOM of a web browser.

FIG. 4 is a block diagram illustrating an embodiment of a client-server system 400 for virtualizing a DOM of a web browser. Virtualization of a DOM of a web browser allows the client-server system to take control of the DOM for different kinds of optimizations, while keeping the virtualization transparent to the web browser. A web browser 402 accesses webpages and other information through a network 404. When web browser 402 sends any network messages onto network 404 that are related to the downloading of webpages or other information, the messages may be either intercepted and processed by a client 406, or directly received and then processed by an edge server 408 supporting virtualization. Webpages or other information related to the webpages that are sent to web browser 402 may be intercepted, filtered, processed, or provided by client 406 or edge server 408. In addition, method API calls by web browser 402 or any JavaScript code to manipulate the objects in a DOM tree may be intercepted, processed, or modified by client 406. Client 406 may also manipulate the DOM tree by making the appropriate method API calls to the DOM tree. As a result, client 406 (or DOM virtualization client 406) and edge server 408 (or DOM virtualization server 408) together create a virtualization engine (also referred to as a nanovisor) for the DOM of web browser 402. The virtualization engine may access and manipulate a DOM tree, including the creation, deletion, or update of nodes within the DOM tree.

Virtualization of the DOM of web browser 402 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage, without compromising the end-user's experience.

In some embodiments, the virtualization of the DOM of web browser 402 is transparent to web browser 402. In some embodiments, the virtualization of the DOM of web browser 402 is also transparent to the end-users. The end-users are not required to install any plugins. In some embodiments, the virtualization of the DOM of web browser 402 is also transparent to the content publishers, without requiring the content publishers to change any program code. In some embodiments, client 406 may be injected into web browser 402 based on standards-based (e.g., HTML or JavaScript) procedures. For example, after edge server 408 receives a request from web browser 402 requesting an HTML webpage file, server 408 may parse the HTML webpage file, inject client 406 into the HTML webpage file, and then send the response back to web browser 402. In some embodiments, client 406 may be injected by adding JavaScript client code in the head section of the HTML webpage file. Client 406 resides within the execution environment for the web browser and virtualizes the code running within the execution environment. In some embodiments, client 406 may be a piece of software that is running outside of the web browser. In some embodiments, client 406 may be integrated as part of the code of the web browser.

Virtualization of the DOM of web browser 402 includes handling static and dynamic interactions with the DOM of web browser 402. Both types of interactions may be intercepted or virtualized by the virtualization engine.

Dynamic interactions with the DOM of web browser 402 include interactions that are affected by JavaScripts, which may include the use of Ajax. The DOM of web browser 402 is virtualized by having client 406 intercept and virtualize method API calls to create, delete, or update elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine.

Static interactions to the DOM of web browser 402 include interactions corresponding to static HTML tags in an HTML webpage file (e.g., the <img src="url for image"/> tag as shown in FIG. 2). An HTML tag redirects web browser 402 to fetch a dependent resource (e.g., an image file) from an URL. Because the static GET request is not made via a JavaScript, the static request is not intercepted by client 406. Instead, the static request is sent by web browser 402 in its native form and then routed over the network, e.g., by means of DNS resolution, to an edge server 408 supporting virtualization.

In some embodiments, edge server 408 may discern whether a GET request is sent by web browser 402 or client 406 using a signature-based scheme, thus enabling edge server 408 to handle the static case as mentioned above. For example, if a GET request was sent by client 406, the GET request would be stamped with a predetermined signature. Conversely, if the GET request was sent directly from web browser 402, as in the static case, the GET request would not be stamped with the predetermined signature.

In some embodiments, when a GET request is sent directly from web browser 402 in a static case, edge server 408 may send dummy content in response, causing web browser 402 to create a dummy node in the DOM tree. At the same time, edge server 408 may also notify client 406, e.g., by sending a JavaScript, that a dummy node has just been created in the DOM tree, thereby eliminating the need for client 406 to poll the DOM tree for any new dummy nodes added to the DOM tree. Client 406, being notified of the newly created dummy node in the DOM tree, may dynamically update the dummy node with the actual content by issuing one or more JavaScript requests to edge server 408. In response to the one or more requests, edge server 408 sends one or more JavaScript updates, which are then intercepted by client 406. Client 406 may then populate the dummy node with the actual image content.

Using the virtualization engine, optimized delivery of information over a network by segmentation and reprioritization of downloaded information can be achieved. Note that the delivery of different information to web browser 402 may be determined by the type of the information. For example, dependent resources such as images, audio clips, and videos may be delivered using different techniques that are optimized based on the type of resource. In some embodiments, the virtualization engine may selectively alter or modify the delivery of only certain types of information (e.g., images). For example, images can be efficiently downloaded to web browser 402 by the virtualization engine, as will be described in greater detail below.

Some image types support non-interlaced and interlaced formats. In a non-interlaced image, the lines are scanned sequentially from the top to the bottom of the image. In an interlaced image, the image is encoded such that the order of the scanned lines is not sequential. The interlaced image file is divided into a series of passes. The first pass shows the image at a lower quality, and the following passes gradually improve the image quality. Image types that support both non-interlaced format and interlaced format include Graphics Interchange Format (GIF) and Portable Network Graphics (PNG).

GIF is a bitmap image format that is widely used on the World Wide Web due to its wide support and portability. The GIF format supports up to 8 bits per pixel for each image, allowing a single image to reference its own palette of up to 256 different colors chosen from the 24-bit RGB color space. The GIF format includes non-animated GIF (referred to as static GIF) format and animated GIF format. An interlaced GIF image is divided from top to bottom into strips 8 pixels high, and the rows of the image are presented in the following order:

Pass 1: Line 0 (the top-most line) from each strip.
Pass 2: Line 4 from each strip.
Pass 3: Lines 2 and 6 from each strip.
Pass 4: Lines 1, 3, 5, and 7 from each strip.

The pixels within each line are not interlaced, but presented consecutively from left to right. As with non-interlaced images, there is no break between the data for one line and the data for the next. The indicator that an image is interlaced is a bit set in the image's header block.

PNG is a raster graphics file format that supports lossless data compression. PNG supports palette-based images (with palettes of 24-bit RGB or 32-bit PRBA colors), grayscale images (with or without alpha channel), and full-color non-palette-based RGB[A] images (with or without alpha channel). PNG offers an optional 2-dimensional, 7-pass interlacing scheme—the Adam7 algorithm. This is more sophisticated than GIF's 1-dimensional, 4-pass scheme, and allows a clearer low-resolution image to be visible earlier in the transfer, particularly if interpolation algorithms such as bicubic interpolation are used.

As described above, rendering an image in an interlaced format (e.g., the GIF interlaced format and the PNG interlaced format) shows a reasonable preview of the image after a first pass of rendering, with the image increasingly turning sharper after subsequent passes. A web browser can begin displaying an image encoded in an interlaced format as it is being downloaded from the network, by rendering each successive pass of the image as it is downloaded and received. Doing so improves on the start-up time experienced by the end-user. Nonetheless, upon a GET for an image, the entirety of the image is downloaded. In some instances, components of the webpage other than the image may have higher priority than the details of the encoded image contained in the subsequent passes, and it would be advantageous to download these important components of the web page before the whole image. In some instances, it is preferable to deploy the bandwidth used to download the whole image to instead download other, more important components of the webpage. However, such prioritization of webpage content is lost when the image is treated as a single binary content.

Therefore, in some embodiments, the startup wait time can be further reduced by first converting a non-interlaced image on a webpage into an interlaced image and then dividing the interlaced image into a plurality of segments. For example, the first segment includes the first one or more passes of the interlaced image and the subsequent segment(s) include the remaining pass(es) of the interlaced image. With the virtualization engine having control of both ends of the communication in a client and server system, the first segment of the interlaced image can be requested by client 406 and sent by edge server 408 first, and then the subsequent segment(s) including the subsequent pass(es) of the interlaced image can be requested by client 406 and sent by server 408 dynamically to refresh and sharpen the image on demand.

Since a webpage may include content retrieved by multiple GET requests, by dividing each GET request into a plurality of GET requests, the server transmit queue is reprioritized to transmit (and web browser 402 is reprioritized to render) the higher priority components (e.g., the first pass of an interlaced image) of each of the GETs first. In particular, if one original GET request corresponds to a huge image, the impact of the huge image blocking all the other GET requests would be lessened. As a result, the latency of seeing the images from the other GET requests is reduced.

Figure 5:
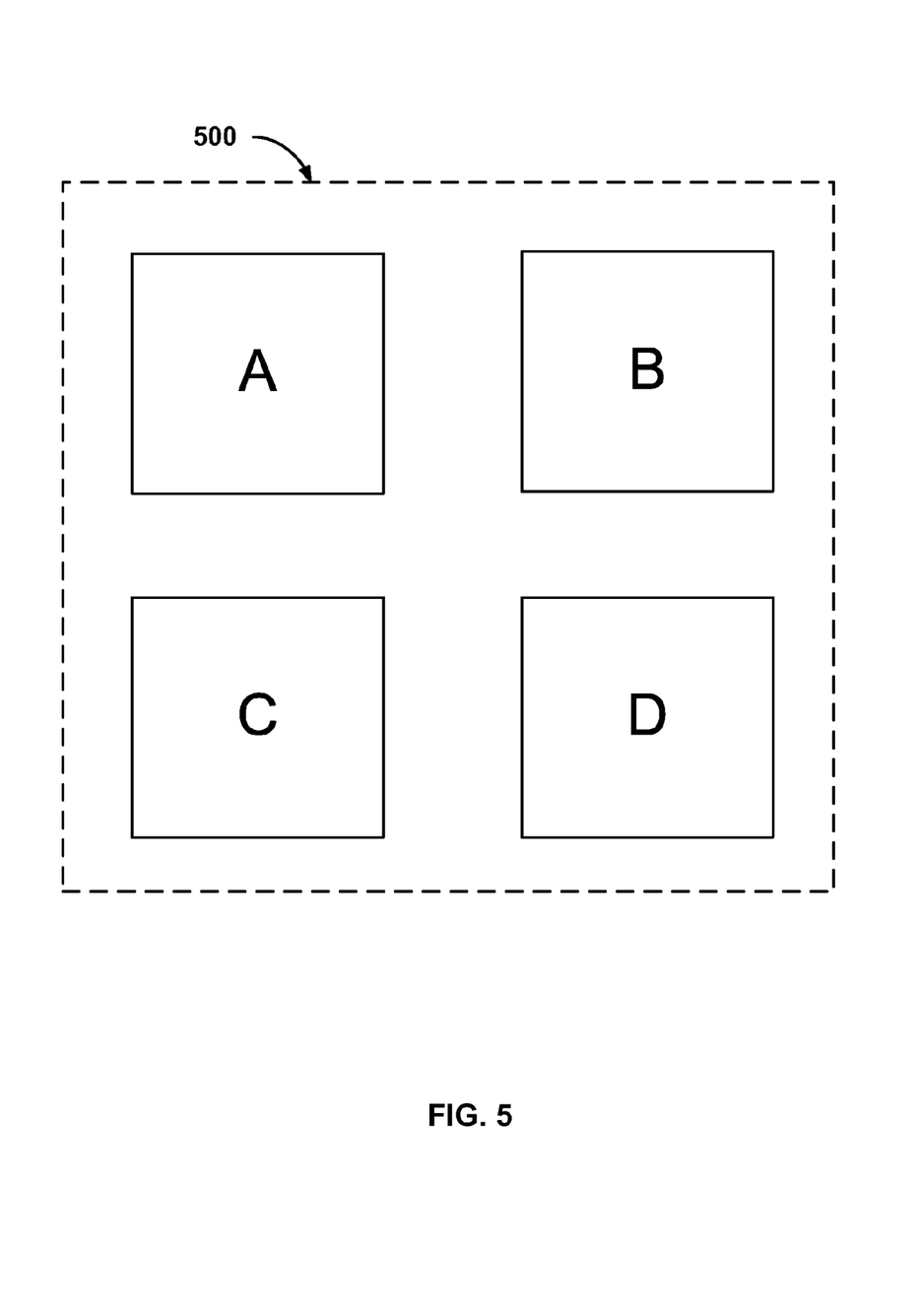
FIG. 5 is a diagram illustrating a webpage 500 that includes four interlaced images, wherein the delivery of the four images may be optimized by the virtualization engine.

FIG. 5 is a diagram illustrating a webpage 500 that includes four interlaced images, and the delivery of the four images may be optimized by the virtualization engine. The four images displayed on webpage 500 are referred to as images A, B, C, and D. Conventionally, a GET request would download an image in its entirety. Suppose the available connection resources can only support two concurrent GET requests. The two GET requests could facilitate the concurrent delivery of only two of the four images A, B, C, and D, in their entirety. As a result, the user experience would suffer as the end-user would not be able to see any of the remaining two images until the delivery of the entirety of the first two images is complete. For example, images A and B will be delivered in their entirety first, followed by images C and D. Depending on the sizes of images A and B, images C and D may remain invisible to the end-user for a considerable length of time.

However, by reprioritizing the delivery of the images A, B, C, and D using the virtualization engine, the first segment of each of the four images A, B, C, and D can be delivered to the web browser first such that the end-user can at least view a degraded version of each image before any of the second segment of each image is delivered to the web browser, thereby improving the end-user's viewing experience. For example, the resources for the two concurrent GET requests may be used to obtain the segments of the four images in the following order: A1, B1, C1, D1, A2, B2, C2, and D2, where A1-D1 are the first segments and A2-D2 are the second segments of the images A, B, C, and D. In this way, the delivery of A1, B1, C1, and D1 are prioritized such that the end-user could more quickly view at least a version of each of images A, B, C, and D based on the renderings of A1, B1, C1, and D1. Any or all of A2, B2, C2, and D2 could be delivered at a later time, depending on one or more factors, such as end-user actions (e.g., if the end-user does not navigate away from webpage 500).

Figure 6:
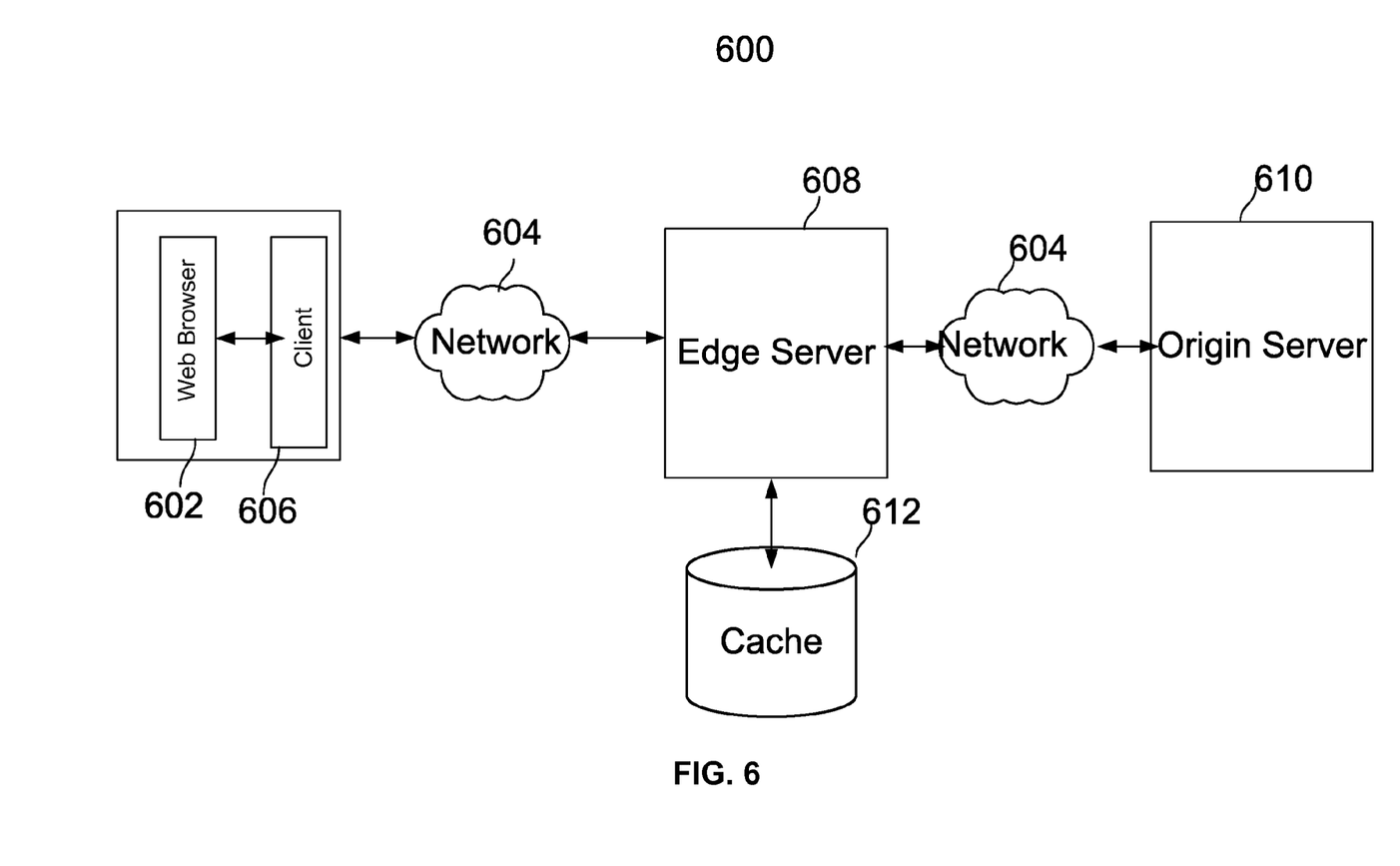
FIG. 6 is a block diagram illustrating an embodiment of a client-server system 600 that can be used to optimize the delivery of images using a DOM virtualization engine.
Figure 7:
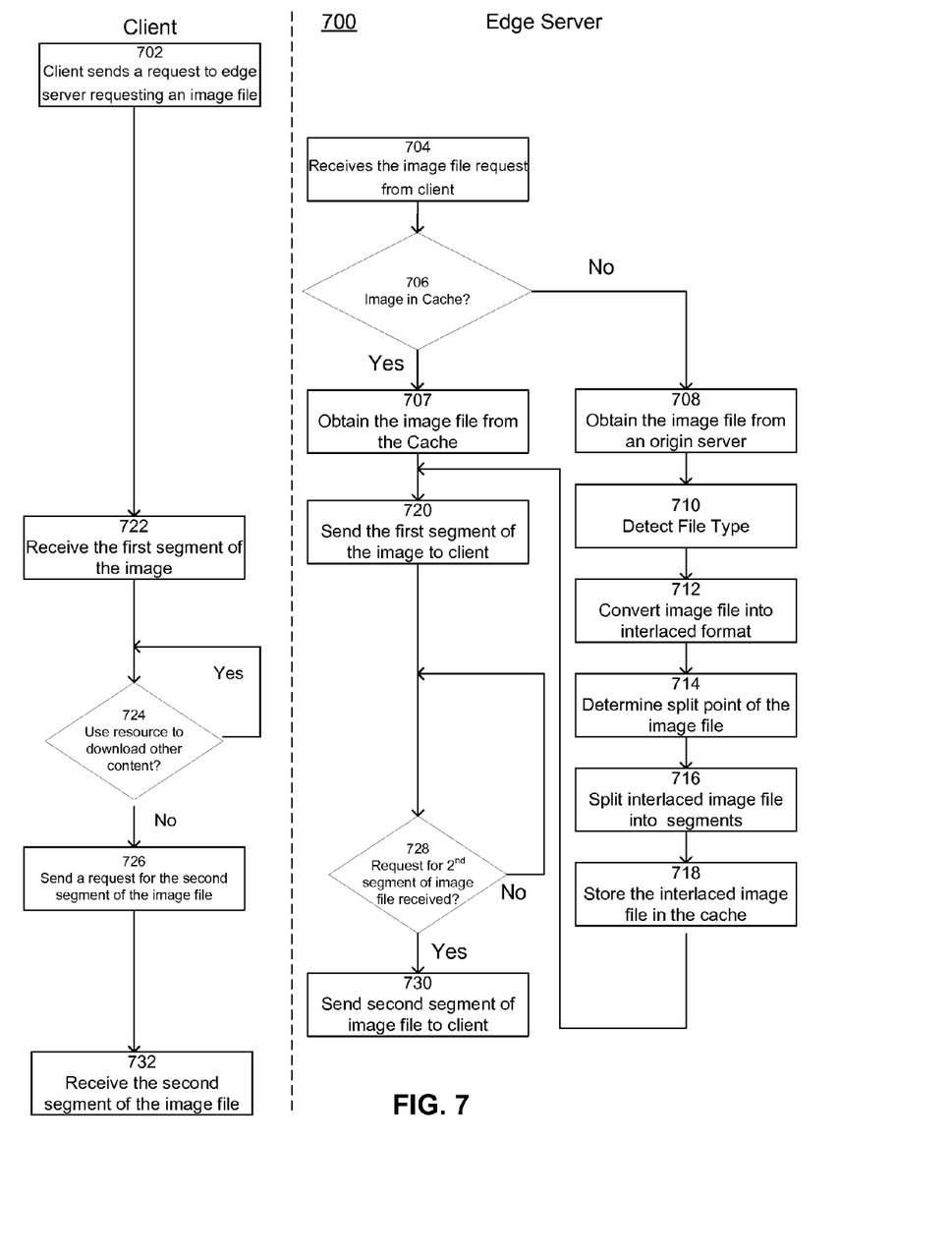
FIG. 7 is a diagram illustrating an embodiment of a flow diagram 700 for optimized delivery of an image associated with a webpage.

FIG. 6 is a block diagram illustrating an embodiment of a client-server system 600 that can be used to optimize the delivery of images using a DOM virtualization engine. FIG. 7 is a diagram illustrating an embodiment of a flow diagram 700 for optimized delivery of an image associated with a webpage. The steps shown on the left side of flow diagram 700 are performed by client 606, while the steps shown on the right side of flow diagram 700 are performed by edge server 608.

With reference to FIG. 7, at 702, client 606 sends a request to edge server 608 requesting an image file to be downloaded. Note that the underlying communication protocol utilized between client 606 and edge server 608 can be any one of many protocols, including proprietary protocols or standards-based protocols such as HTTP. In some embodiments, the request message sent by client 606 may include different information, including the URL of the image resource, the dimensions of the image, and the like. At 704, edge server 608 receives the image file request from client 606. At 706, edge server 608 determines whether the image file is stored in cache 612.

If the image file is found in cache 612, then the image file is retrieved from cache 612 at 707. If the image file is not found in cache 612 (e.g., because the image file is handled by edge server 608 for the very first time), then edge server 608 may obtain the image file from an origin server 610 at 708. At 710, edge server 608 detects the file type of the image file received from origin server 610. For example, if the image file was a PNG image file, then the first eight bytes of the image file would include a PNG file signature. Similarly, if the image file was a GIF image file, then the first three bytes of the header would include a GIF signature. Therefore, the file type of the image file may be determined by detecting the various file type signatures.

At 712, edge server 608 converts the image file into a corresponding interlaced image file. In some embodiments, edge server 608 converts the image file into an interlaced image file without changing the file type of the image file. For example, a non-interlaced PNG file is converted into an interlaced PNG image file (e.g., by using a tool such as optipng), while a non-interlaced GIF file is converted into an interlaced GIF image file. In some other embodiments, edge server 608 converts the image file into an interlaced image file of a different file type. For example, a non-interlaced PNG file may be converted into an interlaced GIF file. Since interlaced image files typically have larger file sizes than non-interlaced image files, edge server 608 may further compress the interlaced image file using an optimizer, e.g., pngcrush.

At 714, edge server 608 determines a split point for dividing the interlaced image file into two segments. A split point may be defined as the partitioning in percentages of the first and second segments in size with respect to the interlaced image file. For example, a split point of 50-50 would have a first segment and a second segment that are each half the size of the interlaced image file.

The split point can be determined based on many factors. The split point may be limited by a minimum size of the first segment such that the first segment at least includes the header of the image file. For example, if the header of the image file is equal to x number of bytes, then the split point should divide the first segment and the second segment in such a way that the first segment is at least x bytes in length.

In some embodiments, the split point may be determined such that the first segment includes a minimum number of passes of the interlaced image file to give an image that satisfies a minimum level of quality.

In some embodiments, the split point may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

In some embodiments, the split point may be determined by identifying a cluster of characterized images in an N-dimensional space to which the image belongs. The image file is assigned a split point that is associated with the identified cluster of characterized images.

At 716, edge server 608 splits the interlaced image file into two segments. In this example, the interlaced image file is divided into two segments only. However, in other embodiments, the interlaced image file may be divided into three or more segments, and multiple split points are determined. At 718, the interlaced image file is stored in cache 612. In some embodiments, the split point value may be stored in cache 612 as well. For example, the split point value may be stored as metadata along with the corresponding interlaced image.

After edge server 608 has either retrieved the interlaced image from cache 612 (at 707) or has stored the interlaced image file in cache 612 (at 718), edge server 608 sends the first segment of the interlaced image to client 606 at 720. When edge server 608 sends the first segment of the interlaced image to client 606, it may include additional information (e.g., the split point value) in the header portion of the message.

At 722, client 606 receives the first segment of the interlaced image. Client 606 then uses the virtualization engine to update the DOM tree with the received image file, and the initial image can be rendered on the screen. In particular, client 606 updates a DOM element associated with the original image file using the received first segment of the interlaced image file instead of the requested image file. The updating of the DOM element using the first segment of the corresponding interlaced image file instead of the original image file is kept transparent to web browser 602.

At 724, the resources for downloading the image file can be made available for downloading other dependent resources associated with the webpage. For example the resources may be used to download other images associated with the webpage, thereby improving the end-user's overall experience.

At 726, client 606 sends a second request to edge server 608, requesting the second segment of the image file to be downloaded. The sending of the second request to edge server 608 is kept transparent to web browser 602 by the virtualization engine. At 728, if edge server 608 receives the request from client 606 requesting the second segment of the image file to be downloaded, then edge server 608 sends the second segment of the image file to client 606 at 730.

At 732, client 606 receives the second segment of the image file. Client 606 then uses the virtualization engine to refresh the image node in the DOM tree with the received image file, and a sharper and higher quality image can be rendered on the screen. For example, client 606 concatenates the first and the second segments of the image file and converts the concatenated data to data URI (Uniform Resource Identifier). The image source is then set with the data URI. Note that although the image source is updated, the change is kept transparent to web browser 602 by the virtualization engine of the DOM tree. The change is also kept transparent to the application code, so no code change of the application is required. For example, suppose that the original image associated with a webpage or an application is "X.png" and the DOM element source is updated to the data URI. As the virtualization engine acts as a middle layer between the DOM tree and the application, the image file continues to appear to the application as "X.png." As a result, any application code (e.g., the program statement "if (src=='X.png')") continues to function without any changes.

Figure 8:
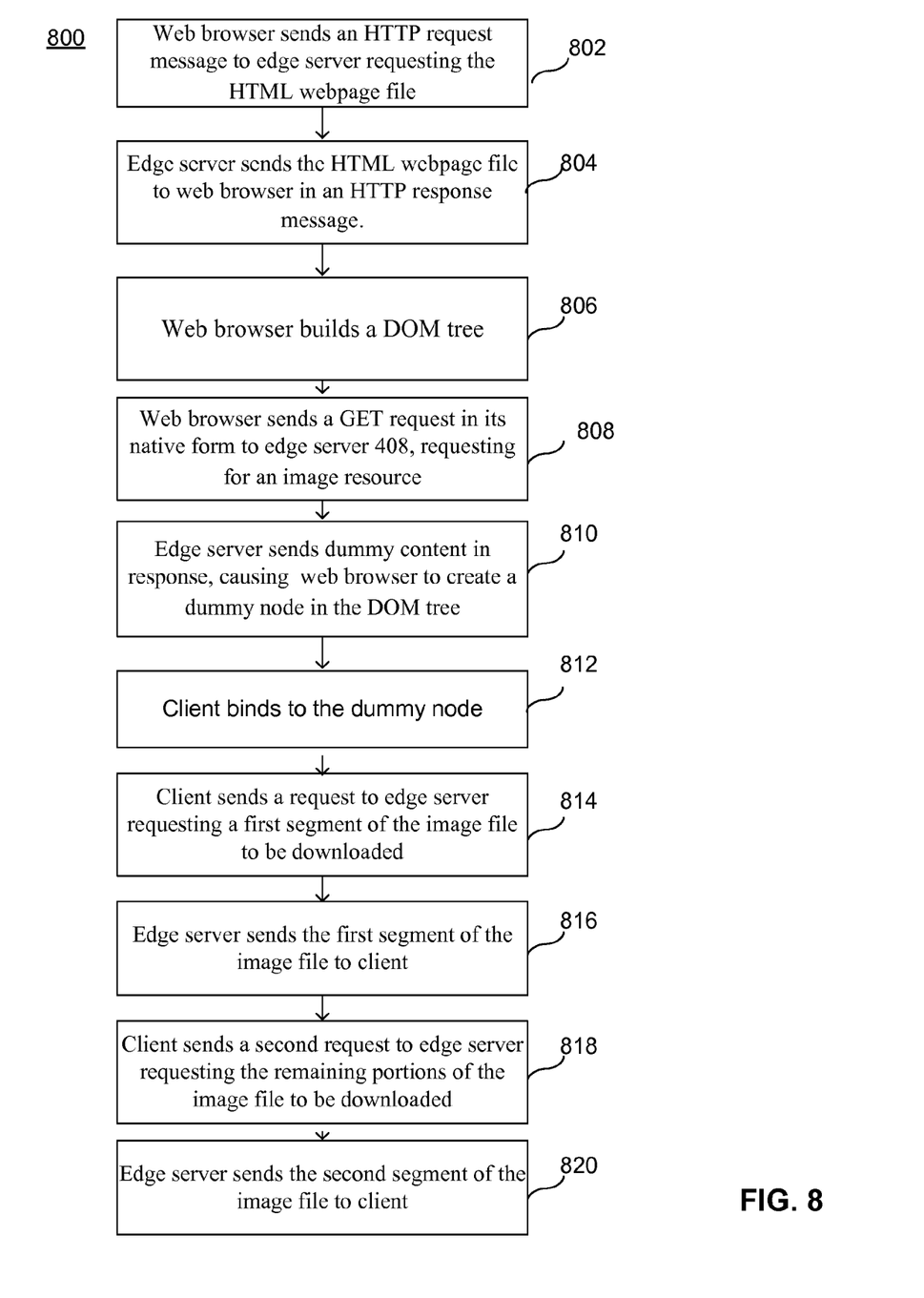
FIG. 8 is a diagram illustrating an embodiment of a flow diagram 800 for optimized delivery of an image resource associated with a webpage.

FIG. 8 is a diagram illustrating an embodiment of a flow diagram 800 for optimized delivery of an image resource associated with a webpage. Flow diagram 800 provides an example for the static case disclosed above. The steps shown in flow diagram 800 are performed on web browser 602, client 606, and edge server 608.

With reference to FIG. 8, at 802, to display a webpage (e.g., webpage 200 as shown in FIG. 2), web browser 602 sends an HTTP request message to edge server 608 requesting the HTML webpage file corresponding to the webpage. After edge server 608 locates the requested HTML webpage file, edge server 608 parses the HTML webpage file, injects client 606 into the HTML webpage file, and then sends the HTML webpage file to web browser 602 in an HTTP response message at 804. Client 606 is then up and running.

At 806, web browser 602 parses the HTML webpage file and builds a DOM tree to represent the various components of webpage 200 in a local memory. For example, when the image tag (shown as <img src="url for image"/> in FIG. 2) is parsed by web browser 602, the image is represented as an image object, and the image object is inserted into the DOM tree accordingly.

After the DOM tree is created, the DOM tree is traversed to retrieve any dependent resources indicated by any of the nodes in the DOM tree via a network. For example, the image object corresponding to the static image tag in webpage 200 redirects web browser 602 to fetch an image file from an URL. At 808, web browser 602 sends a GET request in its native form to edge server 608. Since the GET request is sent directly from web browser 602, the GET request is not stamped with any signature.

At 810, edge server 608 sends dummy content in response, causing web browser 602 to create a dummy node in the DOM tree. Edge server 608 also notifies client 606 that a dummy node corresponding to the image resource has just been created in the DOM tree. At 812, client 606 binds to the dummy node.

At 814, client 606 sends a request to edge server 608 requesting a first segment of the image file to be downloaded. Note that the underlying communication protocol utilized between client 606 and edge server 608 can be any one of many protocols, including proprietary protocols or standards-based protocols such as HTTP. In some embodiments, the request message sent by client 606 may include different information, including the URL of the dependent resource, the dimensions of the image, and the like. In some embodiments, the request message may also include an indication of how the image should be segmented. For example, the request message may specify a percentage (e.g., 70%) of the total size of the image to be downloaded. In some embodiments, edge server 608 determines a percentage of the total size of the image to be downloaded based on network conditions and the like.

At 816, edge server 608 sends the first segment of the interlaced image file to client 606. Client 606 then uses method API calls to refresh the dummy node in the DOM tree with the received image file, and the initial lower quality image can be rendered on the screen.

At 818, client 606 sends another request to edge server 608, requesting the remaining portions of the image file to be downloaded. At 820, edge server 608 sends the remaining portions (e.g., the remaining 30%) of the interlaced image file to client 606. Client 606 then uses method API calls to refresh the image node in the DOM tree with the received image file, and a sharper and higher quality image can be rendered on the screen.

In some embodiments, the refreshing of the image node can be reprioritized based on user actions, user profiles, the statistical behavior of many users in accessing CDN content, or other network profiles.

In some embodiments, the refreshing of the image node can be reprioritized based on user actions. During a browsing session, a user may scroll to the bottom of a webpage before the webpage is loaded to completion. A user may also expand or minimize certain portions of the webpage. These and other user actions can be used to reprioritize the refreshing of the nodes in the DOM tree. For example, if it is detected that the user has scrolled to the bottom of a webpage, then client 606 may delay or disable the refreshing of an image node corresponding to an image that is no longer in the display zone.

In some embodiments, the refreshing of the image node can be reprioritized based on CDN content access statistics. For example, statistics may indicate that very few users choose to look at images on the bottom left corner of the webpage. In this case, client 606 may delay or disable the refreshing of the image nodes corresponding to those images.

Figure 9:
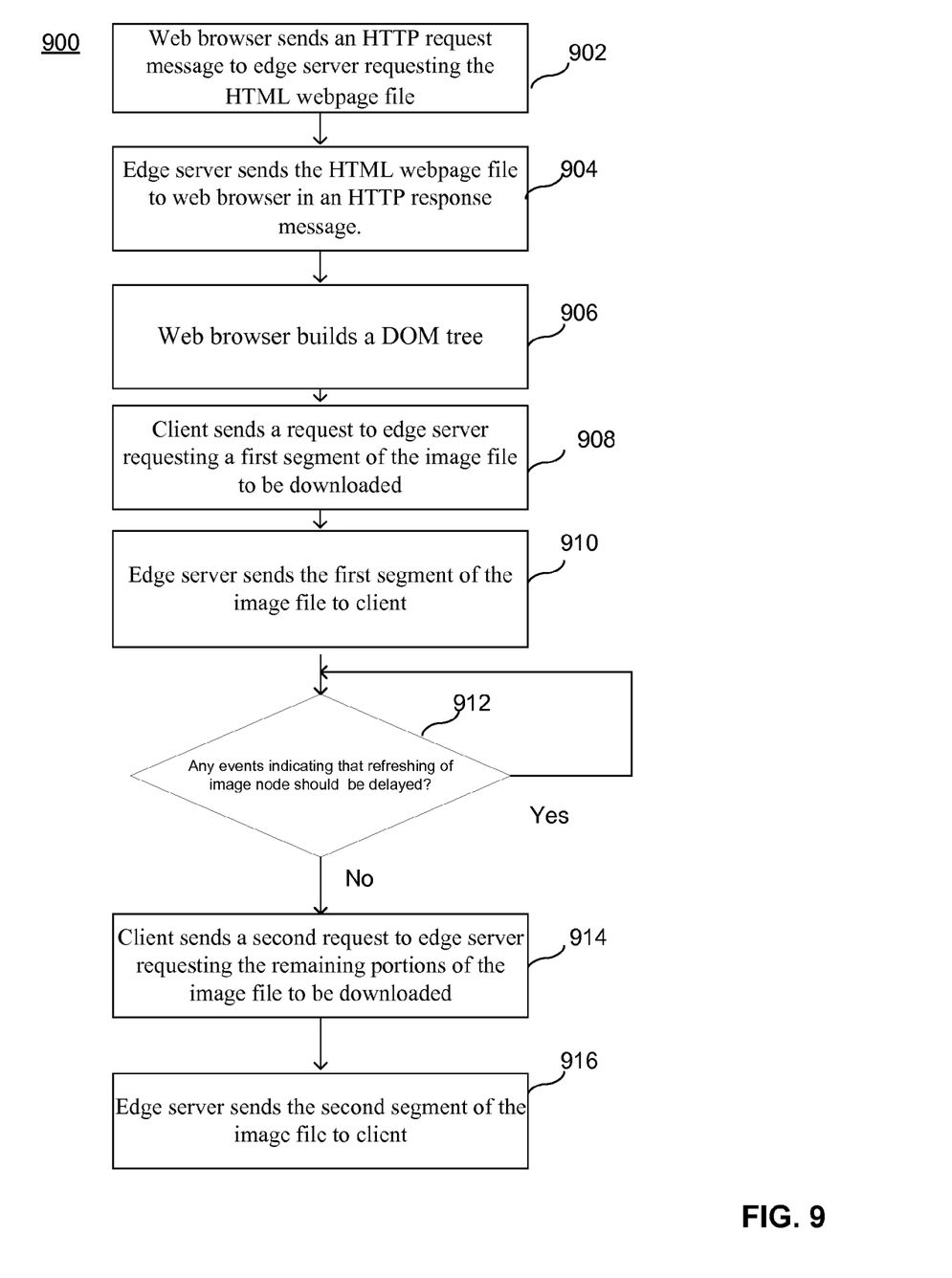
FIG. 9 is a diagram illustrating an embodiment of a flow diagram 900 for optimized delivery of an image resource associated with a webpage.

FIG. 9 is a diagram illustrating an embodiment of a flow diagram 900 for optimized delivery of an image resource associated with a webpage. Flow diagram 900 provides an example for the dynamic case disclosed earlier. The steps shown in flow diagram 900 are performed on web browser 602, client 606, and edge server 608.

With reference to FIG. 9, at 902, to display a webpage (e.g., webpage 200, as shown in FIG. 2), web browser 602 sends an HTTP request message to edge server 608 requesting the HTML webpage file corresponding to the webpage. After edge server 608 locates the requested HTML webpage file, edge server 608 parses the HTML webpage file, injects client 606 into the HTML webpage file, and then sends the HTML webpage file to web browser 602 in an HTTP response message at 904. Client 604 is then up and running.

At 906, web browser 602 parses the HTML webpage file and builds a DOM tree to represent the various components of webpage 200 in a local memory. When the script tag (as shown in FIG. 2) is parsed by web browser 602, a JavaScript is executed. If the JavaScript creates an image node, then the corresponding DOM core level 1 method API call(s) are intercepted by client 606 as part of the virtualization of the DOM, enabling client 606 to control the delivery of the content related to the node.

At 908, client 606 sends a request to edge server 608 requesting a first segment of the image file to be downloaded. Note that the underlying communication protocol utilized between client 606 and edge server 608 can be any one of many protocols, including proprietary protocols or standards-based protocols such as HTTP. In some embodiments, the request message sent by client 606 may include different information, including the URL of the image resource, the height and width of the image, and the like. In some embodiments, the request message may also include an indication of how the image should be segmented. For example, the request message may specify a percentage (e.g., 70%) of the total size of the image to be downloaded. In some embodiments, edge server 608 determines a percentage of the total size of the image to be downloaded based on network conditions, and the like.

At 910, edge server 608 sends the first segment of the interlaced image file to client 606. Client 606 then uses method API calls to refresh the image node in the DOM tree with the received image file, and the initial lower quality image can be rendered on the screen.

At 912, client 606 determines whether there are any events indicating that refreshing of the image node should be delayed or disabled. For example, the events checked by client 606 may be any event related to user actions, user profiles, statistical behavior of many users in accessing CDN content, or other network profiles as disclosed above.

If events are not detected, then client 606 sends another request to edge server 608, requesting the remaining portions of the image file to be downloaded, at 914. At 916, edge server 608 sends the remaining portions (e.g., the remaining 30%) of the image file to client 606. Client 606 then uses method API calls to refresh the image node in the DOM tree with the received image file, and a sharper and higher quality image can be rendered on the screen.

In some embodiments, client 606 may combine more than one GET requests into a single GET request before sending to edge server 608, thereby reducing the overall round trip delays.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering images by an edge server to a web browser, comprising:
  receiving through an interface a request for an image file;
  detecting by a processor the image file as a non-interlaced image file;
  converting by the processor the detected non-interlaced image file to a corresponding interlaced image file;
  sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
  delaying delivery of a second segment of the corresponding interlaced image file until a subsequent request for the second segment of the corresponding interlaced image file is received, wherein the subsequent request for the second segment of the corresponding interlaced image file is sent by the DOM virtualization client, and wherein the sending of the subsequent request is kept transparent to the web browser.

2. The method of claim 1, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser.

3. The method of claim 1, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser.

4. The method of claim 1, further comprising detecting a file type of the image file.

5. The method of claim 1, wherein the interlaced image file has one of the following formats: interlaced PNG format and interlaced GIF format.

6. The method of claim 1, further comprising determining a split point splitting the converted interlaced image file into the first segment and the second segment.

7. An edge server for delivery of images to a web browser, comprising:
   an interface receiving a request for an image file;
   a processor configured to:
      detect the image file as a non-interlaced image file;
      convert the detected non-interlaced image file to a corresponding interlaced image file;
      send a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
      delay delivery of a second segment of the corresponding interlaced image file until a subsequent request for the second segment of the corresponding interlaced image file is received, wherein the subsequent request for the second segment of the corresponding interlaced image file is sent by the DOM virtualization client, and wherein the sending of the subsequent request is kept transparent to the web browser;
   and a memory coupled to the processor and configured to provide the processor with instructions.

8. The edge server of claim 7, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser.

9. The edge server of claim 7, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser.

10. The edge server of claim 7, further comprising detecting a file type of the image file.

11. The edge server of claim 7, wherein the interlaced image file has one of the following formats: interlaced PNG format and interlaced GIF format.

12. The edge server of claim 7, wherein the memory is further configured to provide the processor with instructions which when executed cause the processor to:
   determine a split point splitting the converted interlaced image file into the first segment and the second segment.

13. A computer program product for delivering images by an edge server to a web browser, the computer program product being embodied in a non-transitory computer readable storage medium and comprising computer instructions for:
   receiving through an interface a request for an image file;
   detecting by a processor the image file as a non-interlaced image file;
   converting by the processor the detected non-interlaced image file to a corresponding interlaced image file;
   sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
   delaying delivery of a second segment of the corresponding interlaced image file until a subsequent request for the second segment of the corresponding interlaced image file is received, wherein the subsequent request for the second segment of the corresponding interlaced image file is sent by the DOM virtualization client, and wherein the sending of the subsequent request is kept transparent to the web browser.

14. The computer program product of claim 13, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser.

15. The computer program product of claim 13, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser.

16. A method of delivering images by an edge server to a web browser, comprising:
   receiving through an interface a request for an image file;
   detecting by a processor the image file as a non-interlaced image file;
   converting by the processor the detected non-interlaced image file to a corresponding interlaced image file;
   sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser; and
   delaying delivery of a second segment of the corresponding interlaced image file until a subsequent request for the second segment of the corresponding interlaced image file is received.

17. An edge server for delivery of images to a web browser, comprising:
   an interface receiving a request for an image file;
   a processor configured to:
      detect the image file as a non-interlaced image file;
      convert the detected non-interlaced image file to a corresponding interlaced image file;
      send a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser; and
      delay delivery of a second segment of the corresponding interlaced image file until a subsequent request for the second segment of the corresponding interlaced image file is received; and
   a memory coupled to the processor and configured to provide the processor with instructions.

18. A computer program product for delivering images by an edge server to a web browser, the computer program product being embodied in a non-transitory computer readable storage medium and comprising computer instructions for:
   receiving through an interface a request for an image file;
   detecting by a processor the image file as a non-interlaced image file;
   converting by the processor the detected non-interlaced image file to a corresponding interlaced image file;
   sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file, wherein the DOM virtualization client updates a DOM element associated with the image file using the first segment of the corresponding interlaced image file instead of the image file, and wherein the updating of the DOM element using the first segment of the corresponding interlaced image file instead of the image file is kept transparent to the web browser; and
   delaying delivery of a second segment of the corresponding interlaced image file until a subsequent request for the second segment of the corresponding interlaced image file is received.

19. A method of delivering images by an edge server to a web browser, comprising:
   receiving through an interface a request for an image file;
   detecting by a processor the image file as a non-interlaced image file;
   converting by the processor the detected non-interlaced image file to a corresponding interlaced image file;
   sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
   delaying delivery of a second segment of the corresponding interlaced image file until a subsequent request for the second segment of the corresponding interlaced image file is received, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser.

20. An edge server for delivery of images to a web browser, comprising:
   an interface receiving a request for an image file;
   a processor configured to:
      detect the image file as a non-interlaced image file;
      convert the detected non-interlaced image file to a corresponding interlaced image file;
      send a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
      delay delivery of a second segment of the corresponding interlaced image file until a subsequent request for the second segment of the corresponding interlaced image file is received, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser; and
   a memory coupled to the processor and configured to provide the processor with instructions.

21. A computer program product for delivering images by an edge server to a web browser, the computer program product being embodied in a non-transitory computer readable storage medium and comprising computer instructions for:
   receiving through an interface a request for an image file;
   detecting by a processor the image file as a non-interlaced image file;
   converting by the processor the detected non-interlaced image file to a corresponding interlaced image file;
   sending a first segment of the corresponding interlaced image file in response to the request for the image file, wherein the first segment of the corresponding interlaced image file is received by a Document Object Model (DOM) virtualization client, wherein the DOM virtualization client is injected by adding JavaScript client code in a head section of a webpage file associated with the image file; and
   delaying delivery of a second segment of the corresponding interlaced image file until a subsequent request for the second segment of the corresponding interlaced image file is received, wherein the DOM virtualization client updates a DOM element associated with the image file using the second segment of the corresponding interlaced image file, and wherein the updating of the DOM element using the second segment of the corresponding interlaced image file instead of the image file is kept transparent to the web browser.

* * * * *